(No Model.)

R. F. WILSON.
NON SHRINKING STAVE.

No. 489,063. Patented Jan. 3, 1893.

Witnesses
Wolbry Haynes.
James T. Summerville

Inventor
Richard F. Wilson
By Joshua B. Webster
Attorney

UNITED STATES PATENT OFFICE.

RICHARD F. WILSON, OF STOCKTON, CALIFORNIA.

NON-SHRINKING STAVE.

SPECIFICATION forming part of Letters Patent No. 489,063, dated January 3, 1893.

Application filed October 10, 1892. Serial No. 448,400. (No specimens.)

*To all whom it may concern:*

Be it known that I, RICHARD F. WILSON, a citizen of the United States, residing at Stockton, in the county of San Joaquin and State of California, have invented certain new and useful Improvements in Non-Shrinking Staves; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a tank, for holding water, composed of a series of wooden staves and so constructed that the staves will not shrink, even when exposed to intense atmospheric heat. Such construction consists in a series of chambers within the staves into which water is directly introduced at an inlet located on the surface edge of one of the staves, which inlet connects with the chambers above mentioned so that the water fills them all and may escape through outlets, at the top, into the tank.

Figure 1:
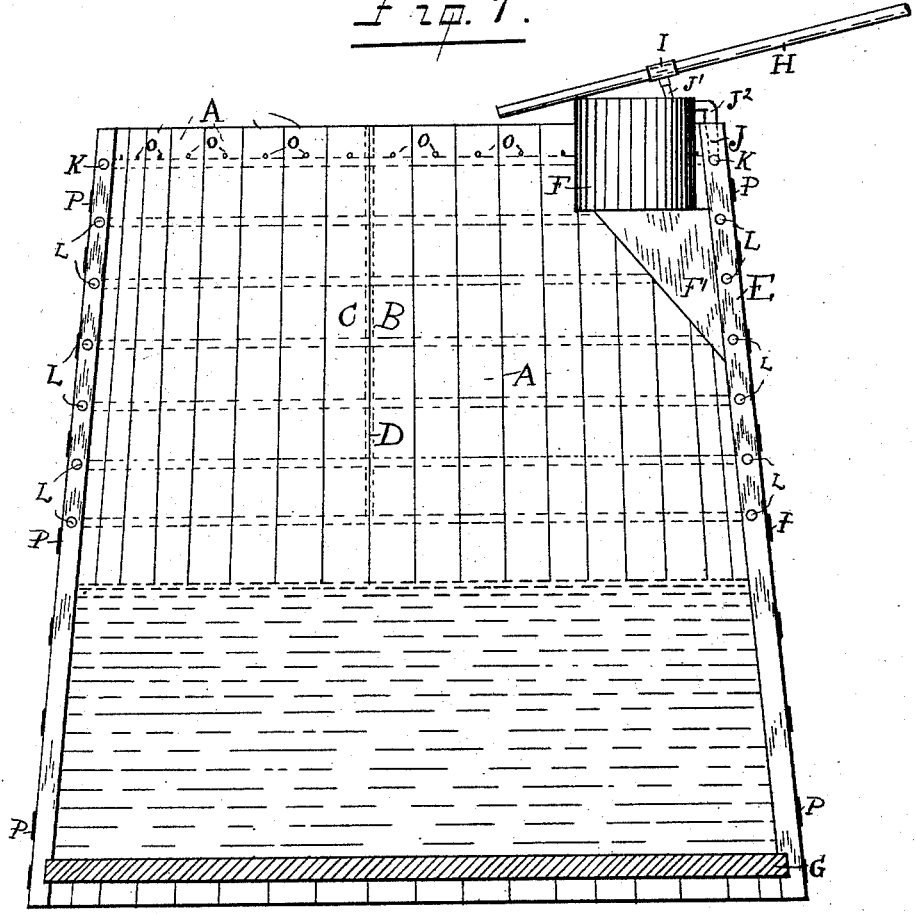
Figure 2:

In the drawings Figure 1 is a vertical section of my improved tank. Fig. 2 is a detached view of the head of two staves, showing the construction necessary to permit the inward vertical flow of water in the staves.

The style of tank I employ is such as is usually located upon an elevated platform and is supplied with water, from a pump, by a connecting trough. A represents the staves of such tank, which in California are usually constructed of redwood, which is a straight and fine grained timber. All of these staves contain a series of cross chambers, the upper one of which is indicated as K and the remainder as L and which consist of round holes directly in a line with each other extending entirely around the tank. Two of the staves immediately adjoining each other, I have indicated as C and B. These staves contain a vertical passage D, which is formed by a groove, in each of their edges parallel with each other.

H represents the feed pipe, upon which, at a suitable point, a T joint I, is attached, from which a supply pipe J' allows the water to flow into a small receiving tank F, supported by a bracket F', which is attached at its foot to the inside of the water tank. A pipe $J^2$ allows the water to flow from the tank F into an inlet J at the top of a stave, which I have indicated as E, and from thence into the chamber K, and from there through the passage D into all the chambers L.

G represents the bottom of the tank.

O are over-flow holes, from which the water escapes and flows into the tank when the chambers K and L are full.

The purpose of first allowing the water to flow into the small tank F is that the sediment may settle at the bottom and only clear water flow through the pipe $J^2$ into the chambers K and L and thus prevent their clogging.

The advantages of my invention, as will be readily seen, are that the grain of the wood of the staves is kept constantly swollen by reason of the supply of the water inside the chambers K and L, and whenever the water is partially drawn away from the inside of the tank, the staves exposed to the sun and wind, are kept moist by the overflow of water through the holes O. The staves are also less liable to decay if kept constantly moist, than they are if sometimes moist and sometimes dry.

The tank is encircled by iron bands P of any required number and size.

Having thus described my invention, what I claim and desire to secure by Letters Patent is:

1. As a new article of manufacture, a water tank, composed of the stave E, supplied with the inlet J, the pipe $J^2$, discharging water into such inlet J, the staves C and B, the vertical passage D formed by parallel grooves in the companion edges of the staves B and C, the staves A, the upper chamber K at the tops of the staves A, B, C, and E, the series of lower cross chambers L, and the overflow holes O of the chamber K, all substantially as shown and described.

2. A non-shrinking water tank composed of wooden staves, and containing water chambers, within the periphery of such staves, communicating with each other by a vertical passage supplied with water at its top by a feed pipe, and overflow holes connecting the upper chamber with the inside of the tank, so that the staves are kept constantly moistened and swollen, substantially as shown and described.

3. The combination of the trough H, the T joint I, the feed pipe J', the receiving tank F, the bracket F', the discharge pipe J², and the tank A B C E G P, the staves of the tank being supplied with the upper chamber K, the series of lower chambers L, the inlet J at the top of the stave E, the vertical passage D and the outlets O, all substantially as shown and described.

4. The combination with a water tank, the staves of which contain a series of horizontal chambers communicating with each other by a vertical passage formed by a groove in the edges of two of the staves, of a receiving tank attached to the inside of the water tank, a discharge pipe from such receiving tank emptying into an inlet in the top of one of the staves, such inlet communicating with the horizontal chambers and vertical passage, so that they are constantly filled with water, all substantially as shown and described.

In testimony whereof I affix my signature in presence of two witnesses.

RICHARD F. WILSON.

Witnesses:
JOSHUA B. WEBSTER,
JAMES T. SUMMERVILLE.